(12) United States Patent
Ting

(10) Patent No.: US 6,275,761 B1
(45) Date of Patent: Aug. 14, 2001

(54) NEURAL NETWORK-BASED VIRTUAL SENSOR FOR AUTOMATIC TRANSMISSION SLIP

(75) Inventor: Thomas L. Ting, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/648,759

(22) Filed: Aug. 28, 2000

(51) Int. Cl.$^7$ ................................................ B60K 41/18
(52) U.S. Cl. ............................ 701/59; 701/51; 706/905
(58) Field of Search ............................. 701/59, 51, 68, 701/53, 58, 64, 67, 87, 90; 192/3.3, 3.31; 706/15, 23, 905, 913

(56) References Cited

U.S. PATENT DOCUMENTS

| | | | |
|---|---|---|---|
| 4,975,845 | * | 12/1990 | Mehta ................................ 364/424.1 |
| 5,063,814 | * | 11/1991 | Baba et al. ............................ 74/866 |
| 5,510,982 | * | 4/1996 | Ohnishi et al. .................... 364/424.1 |
| 5,611,753 | * | 3/1997 | Kondo et al. ......................... 477/118 |
| 5,719,768 | * | 2/1998 | Tashiro et al. ................ 364/424.096 |
| 5,910,176 | * | 6/1999 | Creger ..................................... 701/59 |
| 6,052,640 | * | 4/2000 | Wu ......................................... 701/67 |
| 6,085,136 | * | 7/2000 | Katakura et al. ....................... 701/51 |

\* cited by examiner

*Primary Examiner*—Tan Nguyen
*Assistant Examiner*—Dalena Tran
(74) *Attorney, Agent, or Firm*—George A. Grove

(57) ABSTRACT

A method is disclosed for computer-based control of the timing and level of gear shifts in a multi-speed automatic transmission operated in combination with an internal combustion engine and interposed fluid torque converter. The computer containing power control module signals gear shifts in response to its repeated cyclic processing of engine and transmission operation parameters including torque converter slippage. Here, such slippage is estimated using a neural network with suitable such parameters as input data. In preferred modes of operation, different neural networks are available for selection and use by the computer in different modes of engine-transmission operation.

8 Claims, 1 Drawing Sheet

NEURAL NETWORK-BASED VIRTUAL SENSOR FOR AUTOMATIC TRANSMISSION SLIP

TECHNICAL FIELD

This invention pertains to the control of an automatic transmission using a programmed microprocessor. More specifically, this invention pertains to a virtual sensor for estimating torque converter slip in the operation of a powertrain module in shift control for an automatic transmission.

BACKGROUND OF THE INVENTION

Powertrain control modules (PCM) are now widely used in automotive vehicles to control operations of the vehicle engine and multi-gear ratio automatic transmission. A PCM includes a microprocessor and suitable associated memory chips, input-output devices and the like and is programmed by a vehicle manufacturer to control engine and transmission functions such as air and fuel intake, spark timing and transmission shift schedules. The PCM receives data concerning engine and transmission operation from many electrical and electromechanical sensors.

In an automobile, the transmission is the component that transfers torque from the engine to the wheels to move the vehicle. The transmission does this by providing several forward gear ratios and one reverse gear ratio which enable the engine to accelerate the vehicle quickly, obtain high speeds and reverse the vehicle. An automatic transmission also allows the vehicle to stop while the engine is running without a manual clutch pedal. A torque converter provides this function by acting as a fluid coupling between the crank shaft and flywheel of the engine and the torque input to the transmission. Thus, in some operating modes of the powertrain, there is slippage in the torque converter and a difference between the speed of the engine and the speed of the output shaft of the transmission which cannot be determined from knowledge of the gear ratios of the transmission. This difference, e.g., in revolutions per minute (rpm), is known as slip.

The PCM requires certain inputs in order to control shifting of the forward gear ratios of the transmission. Such inputs include, for example, vehicle speed, throttle position, engine speed, present gear ratio, and transmission output speed. These inputs are provided by suitable electrical and electromechanical sensors associated with the drive axle, throttle and crankshaft, respectively, and electrically connected to the PCM. The PCM then sends signals to shift solenoids to cause suitable transmission upshifts and downshifts, to a transmission fluid pressure control solenoid to adjust shift feel, and to the torque converter control solenoid to engage or release the torque converter clutch. All such sensors must be designed, manufactured and assembled into the powertrain and maintained during vehicle life. For PCM shift scheduling purposes, it is also desirable for the computer to have data concerning torque converter slip because it is a parameter that significantly affects shift timing.

Torque converter slip is the difference between the torque converter input and output speeds. Torque converter input speed is equivalent to engine speed because the converter cover is bolted to the engine fly wheel and turns at engine speed. Data concerning engine speed is important to many PCM engine control functions, and a crankshaft position sensor is used to provide such information. Torque converter output speed is not measured, but in some powertrain designs a transmission input speed sensor (TISS) is used. Transmission input speed is the same as torque converter output speed, and when a TISS is available, the PCM can calculate torque converter slip whenever that data is required for shift control. However, a TISS is another device that must be assembled into the transmission, adding to the complexity and cost of the powertrain.

As increased and less inexpensive computer capacity becomes available for powertrain control use, it would be preferable, where possible, to estimate parameters such as torque converter slip from other available data rather than provide another expensive and, perhaps, vulnerable electromechanical device in the powertrain. Accordingly, it is an object of this invention to provide a virtual sensor for determining torque converter slip.

SUMMARY OF THE INVENTION

A virtual sensor is an estimator which uses measured quantities from a system to estimate another unmeasured quantity from this same system. This invention involves the use of neural network techniques to design a virtual sensor for torque converter slip.

Neural networks are an information processing device usually executed on a computer. They are a compact, well-defined mathematical structure for implementing nonlinear systems, and they utilize a number of simple modules or neurons. Information is stored in the structure by components that at the same time effect connections between the neurons. While they may vary in complexity, neural networks can all be represented by a basic structure. They comprise an input layer of neurons, one or more hidden layers of neurons and an output layer of neurons. A network may have only one layer of input and output neurons, but may feature one or more hidden layers. Each layer may feature any number of neurons.

The precise mathematical calculations performed on the data input to a neural network are a function of the specific network design. This design is characterized by two main components. The first component is the overall network architecture which specifies the number of layers of neurons, the number of neurons in each layer and the specific input and output signals to the system. The second component consists of the specific network weights and activation functions which govern the interaction between neurons. In devising a suitable neural network, it is crucial to determine an appropriate overall network architecture for any given problem or application.

The internal architecture of each individual neuron in a neural network is identical, regardless of the layer in which it resides. This architecture consists of two separate parts: an algebraic operator which computes an input signal to a neuron based on a specific linear combination of output signals from the previous layer of neurons, and an activation function which converts this input signal into some output value. Thus, the output of a neuron in any given layer of the network (except the input layer) is completely determined by the output signals from the previous layer.

An advantage of the neural network approach to devising a virtual torque converter slip (or transmission input speed) sensor is that a network may be constructed and trained to estimate slip even when the mechanics or dynamics of torque converter slip may not otherwise lend themselves to mathematical modeling. In other words, a trial neural network for a virtual sensor may be constructed and its output, predicted torque converter slippage in rpm, may be compared with experimentally measured torque converter slippage of the powertrain system of interest. Engine and transmission operating parameters affecting torque converter slip are selected for input neuron data. The construction and evaluation of the network is assisted using available software. The network is revised until its output suitably simulates the test system.

In accordance with this invention, it is found that a single neural network-based torque converter slip estimator design performs well for some, but not all, operating conditions of the engine-torque converter-transmission combination encountered in vehicle operation. A feature of this invention is development of a single, composite slip estimator which utilizes different neural network designs for different operating conditions of the vehicle. A specific neural network-based slip estimator design can be tailored to perform well for limited specific sets of powertrain operating conditions. An important aspect of this invention is to partition the vehicle's operating envelope into a number of distinct subsets. Then, for each subset, a different slip estimator is designed which performs well under those specific conditions. The final, composite design is obtained by seamlessly transitioning between these different designs via a set of specially designed switching logic rules.

In a preferred embodiment of the invention, overall operations of the vehicle engine-transmission system are treated as comprising three operational modes. The selection of the appropriate mode by the PCM for a current shift decision is based on its evaluation of current vehicle, engine and transmission operating data. For example, a preferred composite virtual slip sensor comprises the use of a crude slip estimator in one mode of engine-transmission operation and two different neural network-based slip estimators in the other two modes of operation. One mode is during vehicle acceleration when the torque converter is multiplying the torque of the engine and is experiencing appreciable positive slip. In other words, the engine speed is greater than the output speed of the torque converter. When this mode of operation is detected by the PCM, a neural network of a first structure and architecture is referenced in the memory of the module and applied. A second mode is during vehicle deceleration and the torque converter is in an "over running" mode and experiencing negative slip. Upon detection of this mode, the PCM looks to a second neural network to estimate slip. Finally, when the vehicle is operating at a relatively high steady speed and the torque converter is locked up, there is little or no slippage and the PCM applies a simple slip estimator calculation for this mode of operation.

In general, a neural network-based slip sensor or estimator would be developed for each engine-transmission-vehicle combination. The identity and number of input neurons will likely vary between the combinations as may the structure of the neural network and the operating modes of the powertrain for application of a network.

Other objects and advantages of this invention will become more apparent from a detailed description of specific embodiments which follows below.

DESCRIPTION OF THE PREFERRED EMBODIMENT

Figure 1:
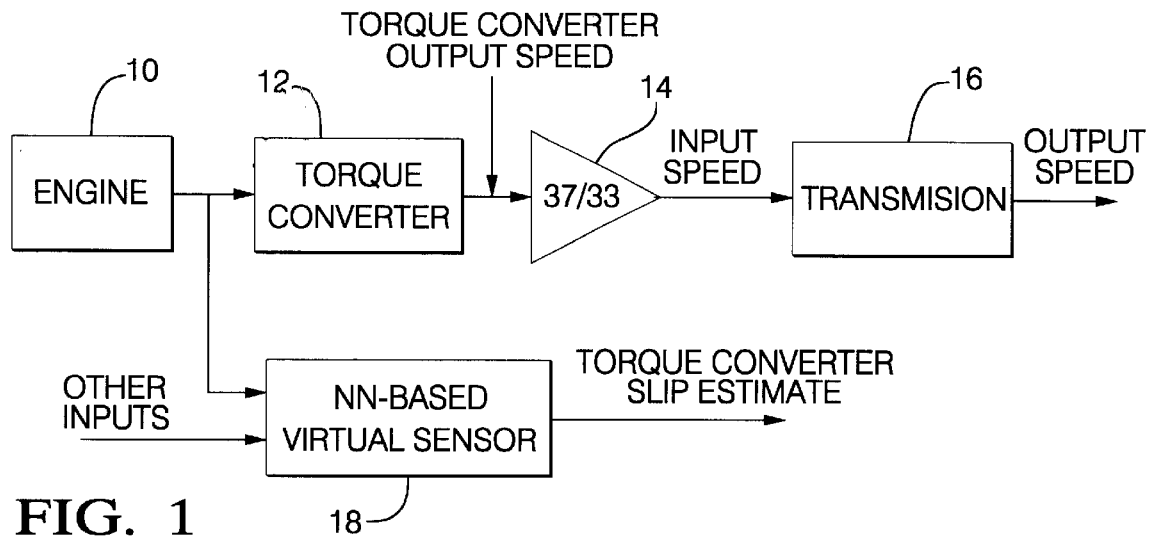
FIG. 1 is a block diagram illustrating components of an engine-transmission system and specific locations in the system in which data concerning speed is relevant to transmission shift schedules.

A simplified block diagram of an engine-transmission system is shown in FIG. 1. Within this block diagram the relevant speed variables are related as follows. The operating condition of the vehicle determines the engine 10 speed which is usually calculated by the PCM using output from a magneto-reluctance type, crankshaft position sensor on the engine. The engine output shaft and the torque converter 12 input shaft are connected through the flywheel so the engine speed and the torque converter input speed are identical. A gear set 14 with a fixed sprocket ratio connects the torque converter output shaft and the transmission 16 input shaft. For purposes of illustration, it is assumed that in a representative automatic transmission the sprocket ratio is 37/33. In such case, Trans Input Speed=(37/33)*Torque Converter Output Speed.

The transmission's input and output speeds are related by a fixed, gear dependent ratio. Again, in a representative four speed automatic transmission, these ratios are taken as: first gear, 2.921; second gear, 1.568; third gear, 1.000; fourth gear (overdrive), 0.705; and reverse, 2.385.

A main variable of interest in automatic transmission performance is the slip variable which is defined as the speed difference between the engine speed and the torque converter output speed. A composite neural network-based virtual torque converter slip sensor is indicated schematically at 18 in FIG. 1. Such a virtual sensor 18 exists as a suitably programmed microprocessor in the powertrain control module of a vehicle as described in the following portion of this specification.

Obviously, the characteristics of this slip variable vary as a function of the demands on the overall engine-transmission system. For instance, when the torque converter is operating in torque multiplication mode, to apply additional torque at low vehicle speeds, the slip variable is relatively large and positive. Conversely, at high vehicle speeds, torque multiplication is no longer needed and the engine and transmission are mechanically coupled (by the torque converter clutch) to provide a more efficient form of torque transfer. In this case, the slip variable is either quite small or even zero.

A crude slip estimate at low slip values may be computed from available, vehicle sensor-based, determinations of the engine speed, transmission output speed and the current PCM gear setting (which is converted into a fixed gear ratio as given above). This estimate may be calculated by the PCM in accordance with the formula Crude Slip Est.=Engine Speed−(33/37)*Trans Output Speed * Gear Ratio Here, the product on the right hand side of this equation can be interpreted as follows. The product of the transmission output speed and the gear ratio produce an estimate of the transmission input speed. Multiplication of this quantity by the inverse sprocket ratio (33/37) produces an estimate of the torque converter output speed. The difference between the measured engine speed and the estimated torque converter output speed provides a crude estimate of the torque converter slip variable.

The quality of this crude slip estimate is highly dependent upon the vehicle operating condition. At higher gear settings ($3^{rd}$ and $4^{th}$ gear), when the torque converter clutch is engaged, the crude slip estimates are quite accurate. However, during engine transients at lower gear settings ($1^{st}$ and $2^{nd}$ gear) when appreciable vehicle acceleration may be occurring, the quality of this estimate degrades significantly. During periods of torque multiplication by the torque converter or in over-running situations, more complex modes of virtual slip sensing must be devised.

Many current production vehicles do not contain either a torque converter output turbine speed sensor or a transmission input speed sensor. Thus, it is not possible to actually measure or directly compute the torque converter slip during vehicle operation. It is desirable to have either measured or accurately predicted transmission input speed data for use by the PCM for transmission shift control. There are both significant cost and performance motivations for developing a high performance transmission slip virtual sensor. It is believed that an improved measurement or estimate of the transmission input speed could be used to alter the transmission shift schedules to provide a substantial fuel economy improvement in vehicles over existing levels.

Such a neural network-based virtual sensor for torque converter slip has been developed. A first step in developing a neural network transmission slip virtual sensor was collecting an adequate amount of reliable data from a test vehicle featuring a production automatic transmission having the gear and sprocket ratios specified above. This task was carried out using Modular Development System (MDS) data collection hardware in conjunction with a 1997 Buick Park Avenue featuring a supercharged 3800 V6 engine. The raw data from the vehicle was collected at an 80 Hz rate, equivalent to a sampling interval of 12.5 msec. To reduce the computational burden throughout the synthesis and analysis procedure, these data sets were further sampled to extend the sampling interval to 100 msec. This interval was selected to balance the reduced computational burden with the need to capture the relevant torque converter dynamics.

None of the test data was collected using a repeated fixed driving schedule. However, an attempt was made to collect data for a variety of different driving conditions including constant velocity, fixed throttle acceleration, deceleration and random real world driving. In the data collection simulating real world driving conditions, a conscious effort was made to simulate three different driving styles: aggressive, normal and passive. Again, this effort did not involve a specific driving schedule, but merely an attempt by the driver to operate the vehicle in general accordance with the desired style. This was done to ensure that the resulting virtual sensor design was both trained and evaluated using data encompassing a wide range of vehicle operating conditions.

Evaluating the Initial Neural Network Design

Despite the existence of a well-established training criterion, the sum-squared error over the entire set of training data, evaluating a neural network design is not necessarily a cut and dried process. It is well known that a good neural network design must perform well within both the entire training data set as well as independently collected validation data sets. However, a more crucial question is "How does one establish the relative quality of two different designs?". Since neural networks are trained using a well-defined training data set and training cost criteria, an obvious first inference is to conclude that for two different designs, the one which achieves a lower cost criteria over the training data set is the superior design. Although this inference is reasonable, it is potentially harmful because there exist numerous examples where a smaller, less complex network performs worse than a larger, more complex network over the training data set, but outperforms it over the entire set of validation data sets. One possible explanation for this phenomenon is the concept of overfitting as described in H. Demuth and M. Beale, "MATLAB, Neural Network Toolbox User's Guide," The Math Works Inc., 1994 [Demuth, 1994]. This refers to the notion that although, in general, the more neurons a network has the better it can fit the data, it is possible, and harmful, to have too many neurons in a design. This phenomenon is not usually visible within the training process, but manifests itself in evaluations with data from outside the training set.

Competing neural network designs must be evaluated using both training and validation set results. The quality of a neural network design is explicitly dependent upon the target application. The cost criteria used in the training process, typically a sum squared error, is often chosen for its smooth easily differentiable characteristics. This simplifies the updating equations for the network weights in the neural network training process. However, for many applications, the desired optimal neural network design is not the one which minimizes the sum-squared error or any other smooth differentiable function which may be chosen as the training cost criteria. For example, in many cases it may be preferable to minimize the maximum instantaneous error value over all time, commonly referred to as a mini-max criteria. Clearly, such an instantaneous performance criteria would be more responsive to sharp transient behavior instead of average, overall performance. Thus, it is clear that the suitability of a sum-squared error cost criteria performance, as an appropriate measure of neural network design quality, depends upon the targeted application. With this caveat in mind, the neural network designs in this embodiment of the invention were evaluated using a combination of sum squared error cost criteria performance (to check for overall performance) and a visual evaluation of simulation time history results (to check for transient performance).

Creating an Initial Neural Network Virtual Sensor Design

The analysis and synthesis of the neural network designs in this invention were conducted using MATLAB, Simulink and the MATLAB Neural Network Toolbox, all commercially available computer aided software design tools [The Math Works, 1997 and Demuth, 1994]. As discussed earlier, the first step in this process was establishing a suitable network architecture. This involved two primary issues: determining the number and identity of the pertinent network inputs and an optimal number of hidden nodes. The initial candidate set of network inputs (9) was determined by an understanding of the physical principles governing transmission operation. Additional inputs (i.e., the torque converter capacity status and the crude slip estimator value) were added when preliminary designs with the initial candidate sets failed to adequately represent system performance throughout the operating envelope. These additional inputs were selected for their ability to identify precisely those conditions where the preliminary designs had performance deficiencies.

The number of hidden nodes in the network architecture was determined through an iterative evaluation process. For each fixed set of 9, 10 and 11 inputs, different candidate designs were developed for architectures featuring 8, 12, 16, 20, 24 and 32 hidden nodes. As expected, increasing the number of hidden nodes improved the training set performance of the system at the cost of increasing system complexity. However, this improved training set performance did not always carry over into improved validation set performance. Through comprehensive system performance evaluations, it was decided to settle on 16 hidden nodes as providing a reasonable balance between overall performance quality and complexity.

Figure 2:
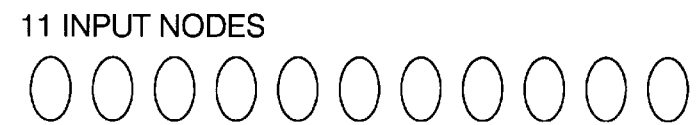
FIG. 2 is a schematic diagram representing an 11-16-1 neural network architecture. This architecture is used to develop neural network-based slip estimators for two distinct sets of engine-transmission operating conditions which are ultimately embedded within the composite virtual slip sensor of this invention.
Figure 2:
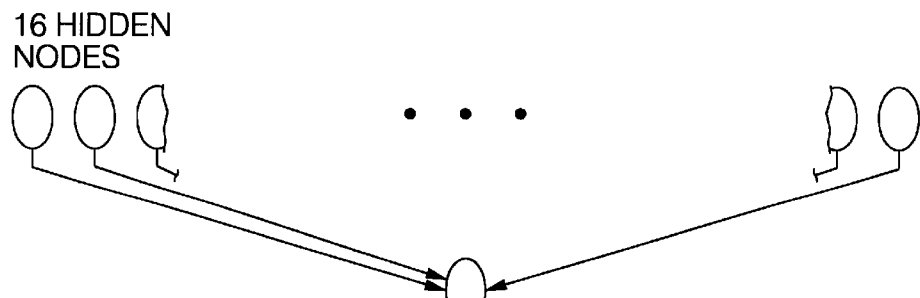

The first full neural network virtual sensor design was conducted using an 11-16-1 network structure as shown schematically in FIG. 2. This means that the network featured 11 inputs: ten inputs taken directly or computed from actual measured variables from the training data set plus one constant bias term input. The ten non-constant inputs were:

1) Computed Engine Torque (ft-lbs)
2) PCM Gear (ranging from $1^{st}$–$4^{th}$)
3) Transmission Hydraulic Pressure (function of true value in PSI)
4) Engine Speed (RPM)
5) Torque Converter Capacity Status (% of PWM duty cycle)
6) Throttle Position (% open)
7) Transmission Fluid Temperature (degrees C.)
8) Computed Turbine Torque (ft-lbs)
9) Transmission Output Speed (RPM)
10) Crude Slip Estimate (RPM).

There was one hidden layer with 16 hidden nodes and one network output variable—a scaled estimated slip value (in RPM). The activation functions in the hidden and output layers were chosen to be a logarithmic sigmoid function and a pure linear function, respectively. The logarithmic sigmoid function provided output values between 0 and 1. Therefore, instead of estimating the actual slip value in rpm, the neural network output variable estimated a scaled slip value given by $$\text{Scaled slip value} = \text{Actual slip value}/3000,$$

where the normalizing factor 3000 was selected to ensure that the scaled slip values had a magnitude of less than 1.

Synthesizing the weights of a neural network design is a user interactive, iterative process which systematically searches through the space of all possible network weight combinations to obtain the best match to the desired input/output properties of the network. These desired properties are represented by user specified sets of input/output data, referred to as the training data. As discussed earlier, the "quality" of the match in this example is represented by the sum-squared error between the predicted and desired outputs of the network. The most fundamental network training methods (often referred to as backpropagation) are gradient based and attempt to minimize this error by adjusting each weight in a network proportional to the derivative of the error with respect to that value.

An alternative approach to network training is based on an approximation of Newton's method called Levenberg-Marquardt [Demuth, 1994]. This approach is more powerful than gradient-based methods, but requires more computing resources. This method essentially switches between the gradient descent method and the Gauss-Newton method based upon the value of a single scalar parameter within the optimization. The idea is that since the Gauss-Newton method is faster and more accurate near an error minimum, one would like to utilize this method whenever it is effective. The objective of the scalar parameter within the Levenberg-Marquardt approach is to discern which of the two optimization techniques is more effective at any given time and implement that particular approach. The above neural network training was conducted using this approach.

For this embodiment of the invention, static, non-feedback neural network architectures were used (i.e., the neural network output was not fed back for use as an input signal, and no past data inputs were retained and subsequently input at future times during the training process). Given the nature of the problem, it was felt that neither a dynamic nor feedback structure would enhance the overall performance of the system.

Sample Calculation of One Neuron

The following is an explanation of the computation of the output of a single internal (hidden layer) neuron within the 11-16-1 network structure. The procedure for computing the outputs of all of the other neurons is similar with changes only in the specific network weights, bias values and activation function associated with that particular neuron. Consider the first neuron in the hidden layer. The network weights connecting the 11 input values to this node are given by the following row vector $$w1 = [-0.2019, 0.3769, -0.0779, -0.0027, 0.0242, -0.0927, 0.0044, 0.2381, 0.0001, -0.0047, 1.038]$$

and the bias term is given by $b1 = 3.6515$. A random selection from experimentally collected data yields the input datapoint $$d1 = [2, 3, 0, 1359.5, 0, 0, 70.5, 1.9922, 1548.3, -21.37, 1]'.$$

Using the information given above, the output of the first neuron in the hidden layer can be computed as follows. First, compute the linear combination signal, LC1, obtained by summing all 11 input signals according to their associated network weights. This is given by the formula $$LC1 = w1 * d1 = -0.8168.$$

Second, this linear combination signal must be adjusted according to the bias value b1 associated with this internal neuron. This bias adjusted signal, Yadj, is given by $$Yadj = LC1 + b1 = 2.8347$$

Third, the final output signal, Yout, of this internal neuron is obtained by passing the bias adjusted signal through the neuron's activation function. For the hidden layer, this activation function is a logarithmic sigmoid function given by the formula $$F(n) = 1/[1 + ê(-n)].$$

Thus, the final output of the internal neuron in this example is given by $$Yout = \text{Logsig}(2.8347) = 0.9445.$$

Composite Neural Network Virtual Sensor Design

In evaluations of the virtual sensor designs, it became apparent that neither the initial neural network-based slip estimator nor the crude slip estimator globally outperformed the other throughout the entire operating envelope. From the evaluation, it appeared that for a majority of this dataset (during the periods when the slip estimation error values were low), the crude slip estimation error appeared to be smaller and display less jitter than the neural network slip estimation error. However, during those periods when the slip estimation error values were large, the neural network slip estimation error was considerably smaller than the crude slip estimation error. A task in making a suitable virtual sensor is to characterize the periods when each type of slip estimator, simple equation or suitably structured and trained neural network performs well in terms of specific vehicle operating conditions. Then this estimator can be utilized during these exact engine-transmission operating conditions.

In general, in this embodiment, the crude slip estimator tended to outperform the neural network-based slip estimator at higher (third and fourth) PCM gear settings, while the opposite was true for lower (first and second) PCM gear settings. This was consistent with the fact that at higher vehicle speeds (typically associated with higher gears), the torque converter clutch is typically engaged, providing a direct mechanical linkage between the engine and transmission for a more efficient transfer of torque. However, this generalization only appeared to hold for static gear operation (i.e., constant gear setting, no gear changes). Every gear change, either upshifting or downshifting, corresponded to a large jump in the crude slip estimation error.

When the torque converter clutch is engaged in the transmission used in this embodiment, it operates in what is referred to as the Electronic Controlled Converter Clutch (EC-Cubed) mode. This mode is activated under two separate vehicle operating conditions: (1) The vehicle is in third gear and in a low-mid throttle range (i.e., <50% throttle but >10% throttle) or (2) the vehicle is in fourth gear. In either case, the EC-Cubed mode regulates the slip to roughly 20 RPM or less. From the analysis of the simulation results, the crude slip estimator performed well when the torque converter was operating in EC-Cubed mode.

Figure 3:
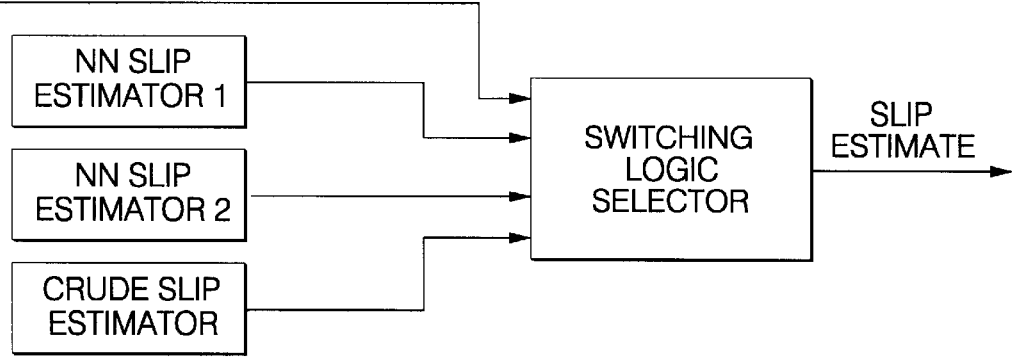
FIG. 3 is a schematic block diagram of a composite virtual slip sensor utilizing two neural networks and a crude slip estimator which are selectively applied by a PCM in different modes of engine-transmission operation.

A methodology to exploit the complementary properties of the crude slip estimator and the neural network structure was developed. The approach was to simultaneously utilize both, switching between the two estimates depending upon the vehicle's operating condition. A block diagram of such an estimation scheme is shown in FIG. 3. In rough terms, the crude slip estimator was activated at static, higher gear conditions while two neural network (NN in FIG. 3) slip estimators were developed for selective use in other operating conditions. Clearly, a critical design issue involves the switching logic module used to control the toggling back and forth between these three estimates.

In its operations, the microprocessor unit of the PCM cycles several times per second to receive signals from its various sensors and to manage engine and transmission functions including the changing of transmission gears. In accordance with this invention, as the PCM determines that a gear shift is required in the present engine-transmission operating mode, the PCM selects the appropriate element from the composite slip sensor for estimation of the present torque converter slip. As the PCM analyzes the operating condition, referring to FIG. 3, it selects the appropriate slip estimator from the three choices illustrated there and described above.

The crude slip estimator has been described above and, as stated, is used in low slip situations. In the other two modes of vehicle operation, the PCM selects one of the two neural networks, depending on positive or negative slip mode, and executes a slip estimation using that network. The two networks are similar or identical in structure. Suitably, they both have the above described 11-16-1 structure with the same 11 inputs stated. The networks differ only in their computing architecture, i.e., the network weights which connect the neurons within their fixed architecture. Each structure has been trained to predict slip in the specific mode to which it is applied. The application and training of these identical structures to different operating conditions governed by different sets of training data results in different network weights, i.e., different algebraic functions are applied to the data at each neuron.

The practice of the invention has been illustrated using two different, but related, 11-16-1 neural networks in a virtual composite torque converter slip sensing method. The neural networks were shown to have great utility in estimating torque converter slip in high positive and negative slip modes of operation of a engine-transmission-vehicle combination. The practices described herein may be used to design torque converter slip estimation method for other engine-transmission combinations and in other modes of their operation.

Thus, while this invention has been described in terms of certain embodiments, it is apparent that other forms could readily be adapted by one skilled in the art. Accordingly, the scope of the invention is to be considered limited only by the following claims.

What is claimed is:

1. A method for estimating torque converter slip speed during computer-based control of shift events of a multi-speed automatic transmission in a vehicle comprising said transmission; an engine; a torque converter having input means driven by said engine, output means for providing torque input to said transmission and a clutch for engaging said input and output means, said torque converter being operable in a slip mode in which there is a difference between the speed of said input and output means sufficient to affect said shift events and a low-slip lockup mode in which said clutch is engaged; a powertrain control module with a programmed micro-processor; and engine and transmission operating parameter sensors, said method being conducted using said control module and comprising reading selected engine and transmission operating parameters during processing cycles of said module for managing gear shifts of said transmission and estimating torque converter slip speed using a neural network during at least one mode of engine and transmission operation producing a slip mode of operation of said torque converter.

2. A method as recited in claim 1 comprising using a first neural network during a first mode of engine and transmission operation and a second neural network during a second mode of engine and transmission operation.

3. A method as recited in claim 1 comprising comparing a present mode of engine and transmission operation with predetermined engine and transmission operation data stored in memory of said module and estimating the current torque converter slip speed using a neural network trained and confirmed for said mode of operation.

4. A method as recited in claim 1 in which said neural network is formed of 11 input neurons, 16 hidden neurons and a single output neuron providing said estimate of slip in rpm.

5. A method as recited in claim 2 in which said first and second neural networks are each formed of 11 input neurons, 16 hidden neurons and a single output neuron providing said estimate of slip in rpm.

6. A method as recited in claim 3 in which a said neural network is formed of 11 input neurons, 16 hidden neurons and a single output neuron providing said estimate of slip in rpm.

7. A method as recited in any of claims 1–3 in which a said neural network comprises as input data engine torque, present transmission gear ratio, engine throttle position, engine speed, transmission fluid pressure and transmission output speed.

8. A method as recited in any of claims 1–3 in which a said neural network includes, as input data, engine torque, present transmission gear ratio, engine throttle position, engine speed, transmission fluid pressure, transmission output speed, torque converter capacity status, transmission fluid temperature, turbine torque, and a slip estimate.

* * * * *